(12) United States Patent
Tembey et al.

(10) Patent No.: US 12,621,315 B2
(45) Date of Patent: May 5, 2026

(54) TELEMETRY-DRIVEN AUTOMATIC IDENTITY-BASED MICRO-SEGMENTATION RECOMMENDATIONS AND RUNTIME ENFORCEMENT

(71) Applicant: Operant AI, Inc., San Francisco, CA (US)

(72) Inventors: Priyanka Mohan Tembey, San Francisco, CA (US); Vrajesh Rajesh Bhavsar, San Francisco, CA (US); Ashley Michelle Chapman Roof, San Francisco, CA (US)

(73) Assignee: Operant AI, Inc., San Francisco, CA (US)

( * ) Notice: Subject to any disclaimer, the term of this patent is extended or adjusted under 35 U.S.C. 154(b) by 232 days.

(21) Appl. No.: 18/414,077

(22) Filed: Jan. 16, 2024

(65) Prior Publication Data

US 2024/0291831 A1     Aug. 29, 2024

Related U.S. Application Data

(60) Provisional application No. 63/448,814, filed on Feb. 28, 2023.

(51) Int. Cl.
*H04L 9/40*          (2022.01)
*G06F 9/54*          (2006.01)

(52) U.S. Cl.
CPC .......... *H04L 63/1416* (2013.01); *G06F 9/546* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 9,967,265 | B1 * | 5/2018 | Peer .................... | H04L 63/1416 |
| 10,248,532 | B1 | 4/2019 | Wasiq et al. | |
| 2018/0176102 | A1 | 6/2018 | Bansal et al. | |

(Continued)

FOREIGN PATENT DOCUMENTS

CN          115237717 A     10/2022

OTHER PUBLICATIONS

Anonymous, International Search Report and Written Opinion, Application No. PCT/US2024/011671, Pub. Korean Intellectual Property Office, May 3, 2024, Seo-gu, Daejeon, Republic of Korea, 9 pages.

(Continued)

*Primary Examiner* — Syed A Roni
(74) *Attorney, Agent, or Firm* — Baker Botts L.L.P.

(57)          ABSTRACT

In an embodiment, a method manages application security in a microservices environment. A local control plane collects telemetry data from microservices via their APIs, aggregates the data into a payload, and transmits it to a central control plane through a message queue. The central control plane constructs a graph representing microservice interactions based on the telemetry data and compares the current graph to a previous version. The method further includes checking whether a destination service matches a malicious hostname or IP address and marking the connection as denied if malicious. The method further includes evaluating compliance with predefined policies and denying interactions that violate those policies for each interaction.

42 Claims, 5 Drawing Sheets

FIG. 3
FIG. 3A
FIG. 3B

(56) References Cited

U.S. PATENT DOCUMENTS

| | | |
|---|---|---|
| 2018/0176261 A1 | 6/2018 | Bansal et al. |
| 2022/0121470 A1 | 4/2022 | Saxena et al. |
| 2022/0245256 A1 | 8/2022 | Wang et al. |
| 2022/0311681 A1* | 9/2022 | Palladino ............ H04L 43/0852 |
| 2022/0311783 A1 | 9/2022 | Meena |

OTHER PUBLICATIONS

Anonymous, "API v3 API reference," https://www.envoyproxy.io/docs/envoy/latest/api-v3/api, retrieval Apr. 19, 2024, 5 pages.
Anonymous, "Authenticate to Google Cloud APIs from GKE workloads" https://cloud.google.com/kubernetes-engine/docs/how-to/workload-identity, Google Kubernetes Enginve (GKE) retrieved Apr. 18, 2024, 13 pages.
Anonymous, "Role Based Access Control (RBAC) (proto)config.rbac.v3.RBAC" API v3 API reference, https://www.envoyproxy.io/docs/envoy/latest/api-v3/config/rbac/v3/rbac.proto#config-rbac-v3-rbac, retrieved Apr. 18, 2024, 12 pages.
Chandramouli, Ramaswamy, "Analysis of Network Segmentation Techniques in Cloud Data Centers," 2015 the 11th International Conference on Grid & Cloud Computing and Applications (GCA '15), pp. 64-70, Las Vegas, NV, National Institute of Standards & Technology Computer Security Resource Center, Gaithersburg, MD, Jul. 30, 2015, 8 pages.

* cited by examiner

1. Telemetry-driven
2. Identity-based
3. API and data flow based

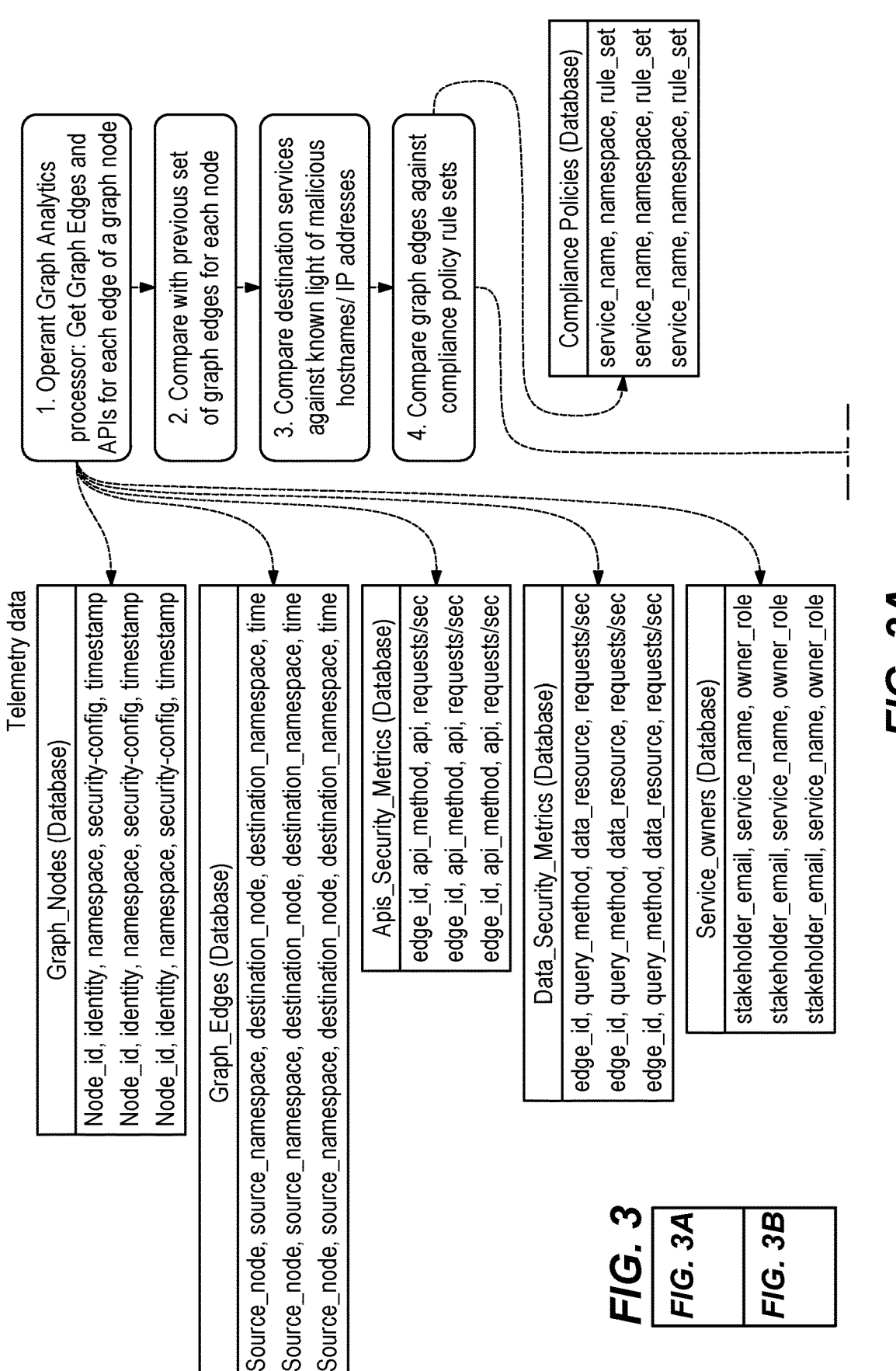

Telemetry data

1. Operant Graph Analytics processor: Get Graph Edges and APIs for each edge of a graph node 2. Compare with previous set of graph edges for each node 3. Compare destination services against known light of malicious hostnames/ IP addresses 4. Compare graph edges against compliance policy rule sets

Compliance Policies (Database)

service_name, namespace, rule_set
service_name, namespace, rule_set
service_name, namespace, rule_set

Graph_Nodes (Database)

Node_id, identity, namespace, security-config, timestamp
Node_id, identity, namespace, security-config, timestamp
Node_id, identity, namespace, security-config, timestamp

Graph_Edges (Database)

Source_node, source_namespace, destination_node, destination_namespace, time
Source_node, source_namespace, destination_node, destination_namespace, time
Source_node, source_namespace, destination_node, destination_namespace, time

Apis_Security_Metrics (Database)

edge_id, api_method, api, requests/sec
edge_id, api_method, api, requests/sec
edge_id, api_method, api, requests/sec

Data_Security_Metrics (Database)

edge_id, query_method, data_resource, requests/sec
edge_id, query_method, data_resource, requests/sec
edge_id, query_method, data_resource, requests/sec

Service_owners (Database)

stakeholder_email, service_name, owner_role
stakeholder_email, service_name, owner_role
stakeholder_email, service_name, owner_role

| *FIG. 3A* |
| *FIG. 3B* |

TELEMETRY-DRIVEN AUTOMATIC IDENTITY-BASED MICRO-SEGMENTATION RECOMMENDATIONS AND RUNTIME ENFORCEMENT

BENEFIT CLAIM

This application claims the benefit under 35 U.S.C. 119(e) of provisional application No. 63/448,814, filed Feb. 28, 2023, the entire contents of which are hereby incorporated by reference for all purposes as if fully set forth herein.

COPYRIGHT NOTICE

TECHNICAL FIELD

One technical field of the present disclosure is computer-implemented methods of network management, security engineering, and security management. Another technical field is cloud computing.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Security engineering is the technical field of understanding networked resources and topologies, determining potential attack vectors, and hardening distributed systems against improper or unauthorized access. Data breaches cost organizations millions of dollars per year. They are usually carried out with compromised account credentials, followed by a lateral movement attack. In a lateral movement attack, the attacker uses the compromised credentials under the guise of an apparently trustworthy identity to move laterally through an organization's networks and ultimately gain access to valuable data assets in the backend networks. After accessing these data assets, the attacker proceeds to steal the data and exfiltrate it to an external location from which the data can be sold in third-party markets or used for other nefarious purposes, especially in the case of personally identifiable information (PII) data, such as stolen credit card information.

Traditionally, stopping lateral movement attacks has involved segmenting networks and Internet Protocol (IP) addresses into known, trusted networks and unknown, untrusted networks; communication between known IP addresses or subnets is allowed, while connections from unknown networks and IP addresses are denied. Such a "micro-segmentation" technique has been extended to internal application networks as applications have been decomposed into the classical three-tier architecture of front-end, application, and database elements. Such a multi-layer adaptation of micro-segmentation can allow known application tiers to communicate with a database tier while blocking the front-end tier from directly communicating with the database tier. Since the front-end tier is logically closer to public networks, such an approach can make the overall application more susceptible to a lateral attack. These rules can be expressed using a set of collected, stored, or configured IP addresses or networks as a client identity since communication patterns between application components typically do not change at runtime. The enforcement of such micro-segmentation policies can occur at so-called east-west firewall layers between the front-end, application, and database tiers Segmenting networks continued to stay relevant as hardware firewalls gave way to software firewalls through the advent of virtualization, which caused security engineers to define micro-segmentation rules as policies encoded within software-defined firewalls. While micro-segmentation continues to serve as an effective defensive technique against lateral movement attacks, micro-segmentation suffers from significant deployment hurdles in cloud-native application stacks. This mismatch is amplified as attack surfaces expand within an application's networks. Consequently, security engineering has developed an acute need for improved technical measures to protect cloud-based applications from lateral attacks and other forms of cyberattacks.

SUMMARY

The appended claims may serve as a summary of the invention.

BRIEF DESCRIPTION OF THE DRAWINGS

In the drawings:

FIGS. 3A and 3B illustrate example algorithms and data transformations that can generate a runtime application security graph in real-time using an embodiment.

DETAILED DESCRIPTION

Figure 1:
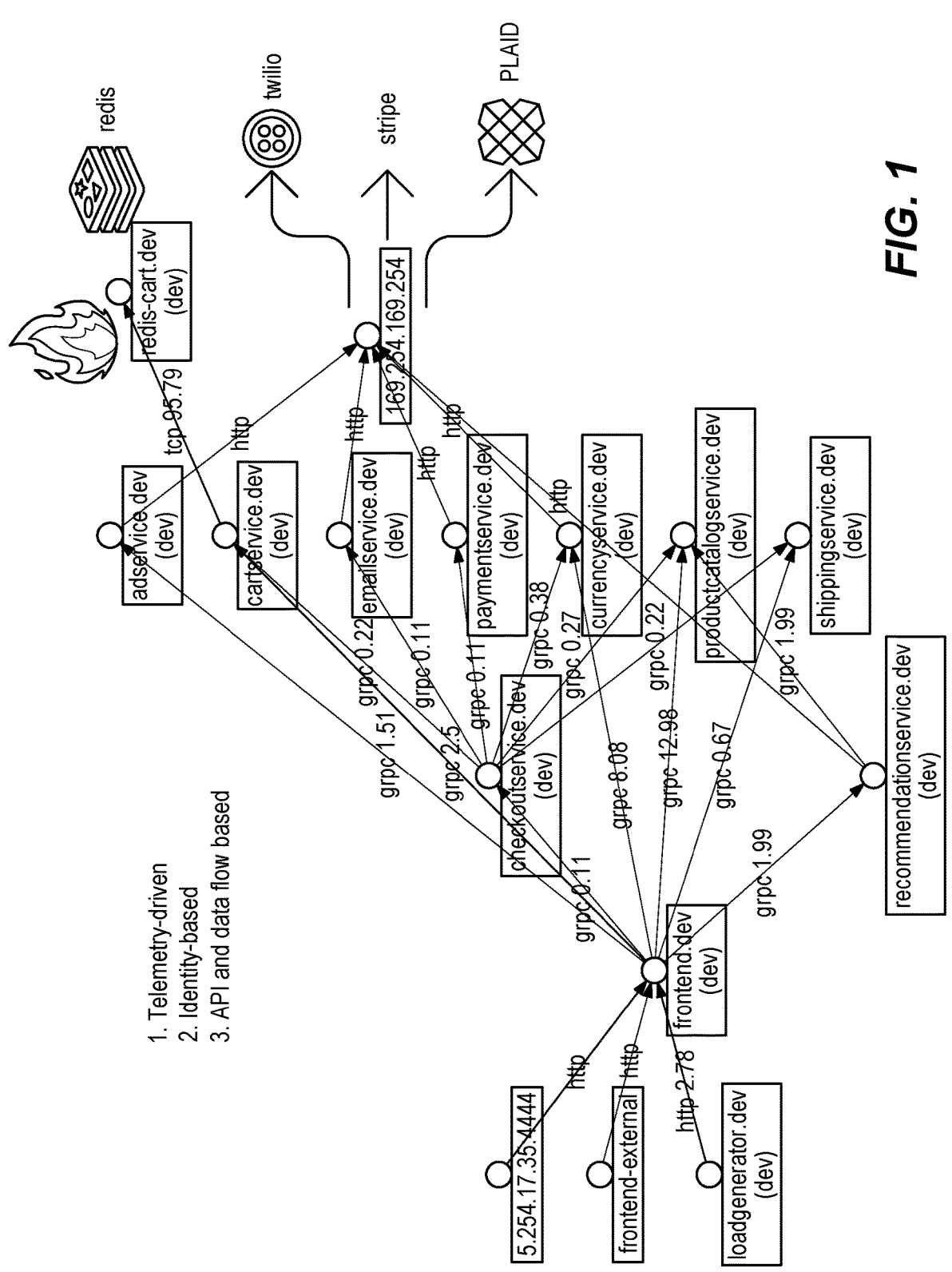
FIG. 1 illustrates an example computer display device with a graphical user interface showing a network graph generated according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. GENERAL OVERVIEW

The present disclosure addresses multiple shortcomings of existing micro-segmentation technology as applied to cloud networks and introduces improvements that the inventors have determined, in an inventive moment, to overcome those shortcomings. The first problem is that static micro-segmentation rules are no longer feasible to deploy in cloud native stacks. Contemporary applications can be deployed in virtual computing centers, cloud networking facilities, or other virtualized data centers using combinations of virtual compute instances and virtual storage instances that are dynamically instantiated and torn down based on load or demand. These architectures are no longer limited to the classical three tiers of front-end, application, and database. Instead, applications can use hundreds or thousands of microservices that programmatically call or interconnect with each other and, in turn, connect with multiple distributed data backend systems. When communication patterns were static and well-known in monolithic stacks of three-tiered applications, trusted communication segments could be defined before deploying applications. In contemporary cloud-based architectures, the connection patterns between microservices are dynamic and unknowable in advance, hindering the definition of micro-segments before deployment or using static rules.

To use micro-segmentation today to protect cloud-native microservice-based applications against data breaches, the segments would have to be dynamically created based on runtime knowledge of communication patterns between microservices and would need to adapt as the communication patterns evolve over time. This sort of real-time telemetry describing runtime microservice interactions, which could help drive the creation of adaptive micro-segments, is a technological capability lacking in today's security tools.

Furthermore, micro-segmentation rules can no longer be limited to Layer 3 and Layer 4 of the networking stack. In private data centers, micro-segments could be defined based on OSI Layer 3 and Layer 4 of the network stack, referring to the values of IP addresses and ports, as described in Chandramouli, R. (2015), "Analysis of Network Segmentation Techniques in Cloud Data Centers," The 11th International Conference on Grid & Cloud Computing and Applications, Las Vegas, NV, [online], which can be found by navigating to the top-level domain tsapps.nist.gov and accessing the "publication/get_pdf.cfm?pub_id=918440" page. However, in the new cloud-native world, defining rules based on Layer 3 values or Layer 4 values alone is impractical and unreliable. IP addresses in cloud-native stacks, like Kubernetes, are ephemeral and constantly change as application instances restart, which renders irrelevant any rules that have been defined in terms of IP addresses. Furthermore, applications today communicate using Layer 7+ protocols such as HTTP, GRPC APIs, and custom data protocols such as Kafka, Mysql, and others. Micro-segmentation policy expressions need to be defined in terms of application identities and encompass Layer 7+ protocol expressions, such as whether a service is allowed to make certain API calls, or if a service is allowed to make certain database queries, or if a service is denied access to certain third-party API calls in the case of highly regulated application domains.

Next, classical micro-segmentation rules are not identity-aware. Contemporary concepts of identity include service identities, API keys, certificate-based identities, and more. As the number of machine identities has exploded in the cloud-native world, tracking who has access to what resources within cloud-native tech stacks becomes difficult. Consequently, account identities typically receive too many permissions and, if compromised, can provide attackers with access to several critical data assets easily. Micro-segmentation rules for cloud-native application stacks need to allow expressions concerning how such higher-level identities beyond IP addresses are allowed or denied access to cloud-native resources such as microservice APIs, databases, or cloud object stores. Only a modernized identity-aware approach can minimize the attack surface left open to any identity or role in the application stack.

In various embodiments, a computer-implemented method, distributed systems architecture, and computer program product are programmed to provide automatic, identity-based application-layer micro-segmentation recommendations for cloud-native applications based on runtime application traffic telemetry. Embodiments also are programmed to enforce these security recommendations and policies in network environments in real-time. Embodiments improve upon existing technology in multiple ways.

First, embodiments are runtime-based and telemetry-driven. Rather than using static and/or manual approaches for segmenting known networks before deploying an application, embodiments are programmed to dynamically identify microservice interactions by collecting telemetry data at runtime in real time and using the telemetry data to recommend lists of trusted segments between services. Embodiments are programmed effectively to adapt the creation of microsegments to changing patterns in application-layer traffic over time. Creating microsegments adaptively at runtime ensures that micro-segmentation projects can be successfully deployed for highly dynamic and constantly changing cloud-native tech stacks. By discovering how microservices communicate internally at runtime, embodiments are programmed to collect and report to security teams the information needed to successfully create microsegments ahead of time.

FIG. 1 illustrates an example computer display device with a graphical user interface showing a network graph that has been generated according to an embodiment. As seen in FIG. 1, embodiments are programmed to discover microservice interactions dynamically and to display a visual representation of the microservice interactions in the form of an application connectivity graph. In an embodiment, graph analytics methods are programmed to process data describing the microservice interactions and to recommend micro-segmentation policies. An example recommendation could be that the "cartservice" microservice can communicate with the Redis data cache, but all other services cannot communicate with the cache. In this manner, embodiments would reduce the attack surface for potential lateral movement attacks through other services to reach critical data stored within the Redis cache. Similarly, an embodiment might recommend that only the payment service microservice can communicate with external, third-party APIs like Twilio or Stripe, while the "cartservice" microservice cannot do so. A recommendation of that type would reduce the movement of sensitive data, such as payment information, to only those services that need to process it at runtime.

Embodiments are programmed to generate micro-segmentation policies that are based on runtime identity and not IP addresses. In this context, a runtime identity is defined at the application layer and includes certificate identifiers of service accounts, API keys, user email addresses, and service account roles or user roles. An example application identity implementation for Google Cloud Applications is described in Anonymous, "Google Kubernetes Engine (GKE)>Documentation>Guides-Use Workload Identity," available online at the time of this writing by navigating to the top-level domain cloud.google.com and accessing the "kubernetes-engine/docs/how-to/workload-identity" page. Expressing policies in terms of runtime application identities enables effective interoperation with cloud-native stacks because IP addresses and ports are ephemeral entities. For example, in Kubernetes stacks, IP addresses that have been provisioned for application pods keep changing as the pods get replaced, thereby rendering micro-segmentation rules defined in terms of IP addresses meaningless over time. As seen in FIG. 1, in an embodiment, microsegments are defined in terms of service identities, such as the Kubernetes service account identity (cartservice.dev) corresponding to the "cartservice" microservice is allowed to communicate with the Redis cache, and no other identity may communicate with the Redis cache. In this context, service identities can comprise the common names within certificates that have been provisioned for service accounts.

Embodiments are programmed based on a zero-trust model. Formerly, firewall implementations could be based on perimeter security, in which all untrusted devices or applications are outside the firewall perimeter while elements needing protection from untrustworthy actors are inside the firewalled domain. For today's cloud-native application stacks, perimeter security is non-existent because applications are no longer deployed in controlled private networks. Instead, applications are deployed in public cloud networks, leaving open attack surfaces both external and internal to the applications. For cloud-native application stacks, embodiments apply zero trust to all programmatic messages, requests, or other communication, and the identity of an application must always be verified using cryptographically sound authentication mechanisms. Furthermore, in an embodiment, micro-segmentation policies enforce zero trust for all communications between services. Therefore, rather than checking for IP addresses or subnet identifiers that can easily be spoofed, embodiments are programmed to use stronger forms of secure identifiers, such as TLS certificate common names or authenticated JSON Web Token (JWT) claims to determine whether a service can communicate with another service. A zero-trust model implemented in this manner helps establish stronger guarantees for more secure communication between microservices.

Finally, embodiments are based on Layer 7+ APIs and data flows. Since almost all microservice interactions are based on Layer 7 protocols, micro-segmentation policies in embodiments express policies to allow or deny programmatic traffic using Layer 7 semantics. For example, a policy may specify that a payment service can communicate with specified external third-party payment processing APIs and notification services like Stripe and Twilio. By moving beyond coarser micro-segmentation rules based on IP subnets, the micro-segmentation rules of embodiments allow for fine-grained, custom, application-centric policies depending on the application layer protocol while minimizing opportunities for lateral attack.

2. STRUCTURAL & FUNCTIONAL OVERVIEW

2.1 Distributed Computer System Example

Figure 2:
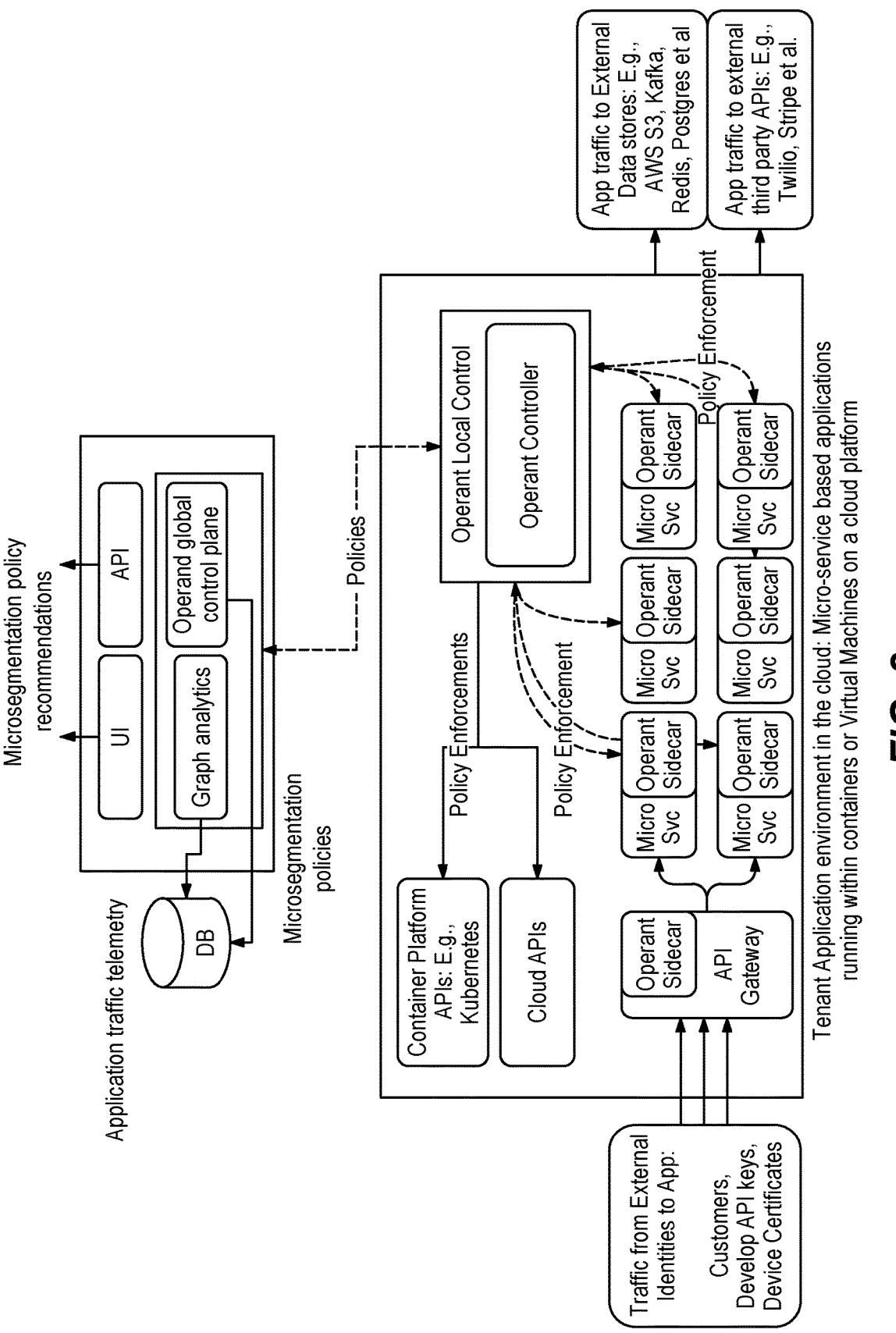
FIG. 2 illustrates a distributed computer system showing the context of use and principal functional elements with which one embodiment could be implemented.

FIG. 2 illustrates a distributed computer system showing the context of use and principal functional elements with which one embodiment could be implemented. In an embodiment, a computer system of an embodiment of FIG. 2 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 2 illustrates only one of many possible arrangements of components configured to execute the programming described herein. Other arrangements may include fewer or different components, and the division of work between the components may vary depending on the arrangement.

FIG. 2, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of multi-layer security engineering for cloud-native applications. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As shown in FIG. 2, embodiments can be configured and programmed to deploy a hybrid architecture comprising the following components:

Local Control Plane: This part of the architecture is deployed within a customer environment as a controller service, a time series database, and a per-customer microservice sidecar process. The implementation of sidecar processes in other contexts is described in Anonymous, "Envoy: Envoy documentation," which is available online at the time of this writing in the document tree by navigating to the top-level domain www.envoyproxy.io and accessing the "docs/envoy/v1.24.1/" page. In one embodiment, a user or the customer deploys the local control plane using a script that interfaces with the customer's container platform API (e.g., the Kubernetes cluster API) to bring up the components. The controller service and the time series database launch as application containers running within the customer environment. The sidecar process hooks into the microservice's network path and thus has access to the APIs and data flows flowing in and out of the microservice. Establishing programmatic connections or hooks for this purpose is described, for other contexts, in J. Song, "Understanding the Sidecar Injection, Traffic Intercepting & Routing Process in Istio," available online at the time of this writing by navigating to the top-level domain jimmysong.io and accessing the "en/blog/sidecar-injection-iptables-and-traffic-routing/" page. Microservices within a customer environment serve incoming requests coming through the frontend gateway layer from external customers, API developer accounts, and devices. An external request may traverse multiple internal microservice API layers as well as third-party API/data layers before a response is sent back to the external clients.

The controller service brings up the sidecar processes per microservice. To do this, the controller interfaces with the container platform API to derive a list of microservice containers deployed within the cluster. Using a sidecar webhook injection mechanism provided by the container platform, the controller adds the sidecar alongside each application. For the Kubernetes platform, an example injection mechanism is described in Anonymous, Kubernetes: Dynamic Admission Control, which is available online at the time of this writing by navigating to the top-level domain kubernetes.io and accessing the "docs/reference/access-authn-authz/extensible-admission-controllers/" page. Whenever there is a new microservice deployed in the customer environment, the webhook mechanism is used to deploy a new sidecar alongside each new microservice. The controller service goes on to configure the sidecars to look at specific telemetry data within microservice API and data flows such as:

Request source hostname
Request destination hostname
Request destination port
Request source service name (if any)
Request source namespace (if any)
Request destination service name (if any)
Request destination namespace (if any)
Request API endpoint
Request API method (Post, Get, Put, Delete etc)
Request protocol (Http, GRPC, TCP, Mysql etc)
Request authentication headers (if any)
Response code (if any)
Response Error message (if any)
Response Error status (if any)
Number of requests The particular sidecar implementation takes as an input a configuration document provided by the system in JSON or YAML specifying the parameters above and configures its telemetry output accordingly. Embodiments can be programmed to go further in customizing the telemetry output specific to application layer protocols implemented by the microservice containers. As an example, an embodiment can be programmed to automatically detect known open ports on microservice containers (e.g., port 3306, which is a well-known server port for the Mysql database service) and configures the Mysql container's sidecar to output telemetry relevant to the Mysql protocol. This list of keys and metrics constitutes a metric tuple stored in the time series database.

The controller service configures the sidecar processes to send metrics to the time series database for the application traffic seen every 15 seconds. TABLE 1 presents an example of code that can be used for this configuration:

TABLE 1

CONFIGURING SIDECAR TO SEND METRICS

```
apiVersion: install.istio.io/v1alpha1
kind: IstioOperator
spec:
  profile: minimal
  meshConfig:
    defaultConfig:
      extraStatTags:
      - request_method
      - request_urlpath
      - request_authorization
  values:
    telemetry:
      v2:
        prometheus:
          configOverride:
            inboundSidecar:
              metrics:
              - name: requests_total
                dimensions:
```

TABLE 1-continued

CONFIGURING SIDECAR TO SEND METRICS

```
              request_method: request.method
              request_urlpath: request.url_path
              grpc_response_status: response.grpc_status
              request_authorization:
              request.headers.authorization
           - name: request_duration_milliseconds
           dimensions:
              request_method: request.method
              request_urlpath: request.url_path
              grpc_response_status: response.grpc_status
    outboundSidecar:
      metrics:
         - name: requests_total
           dimensions:
              request_method: request.method
              request_urlpath: request.url_path
              grpc_response_status: response.grpc_status
              request authorization:
              request.headers.authorization
         - name: request_duration_milliseconds
           dimensions:
              request_method: request.method
              request_urlpath: request.url_path
              grpc_response_status: response.grpc_status
    gateway:
      metrics:
         - name: requests_total
           dimensions:
              request_method: request.method
              request_urlpath: request.url_path
              grpc_response_status: response.grpc_status
              request_authorization:
              request.headers.authorization
         - name: request_duration_milliseconds
           dimensions:
              request_method: request.method
              request_urlpath: request.url_path
              grpc_response_status: response.grpc_status
```

A control loop within the controller service queries the time series database every configurable amount of time to retrieve traffic telemetry metrics such as requests per second, successful requests/sec, errors/sec, and requests missing security parameters such as required authentication headers or ill-formed API expressions. These queries help filter the required data needed by the system from the time series database to ascertain the interconnections between microservices and their security characteristics. TABLE 2 presents an example query.

TABLE 2

EXAMPLE RETRIEVAL QUERY

```
sum+by+(source_workload,source_workload_namespace,destination_service_name,re
quest_protocol,destination_service,destination_workload,destination_workload_
namespace,request_urlpath,request_method)((rate(istio_requests_total{reporter
='source',source_workload_namespace=~'%s'}[300s]))+or+(rate(istio_tcp_sent_by
tes_total{reporter='source',source_workload_namespace=~'%s'}[300s]))+or+(rate
(istio_requests_total{reporter='destination',destination_workload_namespace=~
'%s',source_workload_namespace='unknown'}[300s])))
```

The controller service connects with a metadata service to retrieve additional information about services and applications seen in the traffic telemetry data. The metadata service is specific to the customer environment. In various embodiments, the metadata service could be the Kubernetes cluster API server if the customer applications are deployed within a Kubernetes cluster and the cloud provider API for the cloud system in which the customer applications are deployed. The information obtained from the metadata service can include the source and destination namespaces in the case of Kubernetes applications, container names, or virtual machine names. All such data constitutes additional annotations and context that the controller service adds to the metric tuple. For a Kubernetes implementation, the controller service queries the Kubernetes API server for service descriptions of source and destination host names seen in the traffic telemetry data. The service descriptions internally have certain "selector" key value labels that point to the microservice deployment/container names in the cluster. Querying the Kubernetes API server for container names specific to the selector labels provides additional metadata about the containers behind the service names.

Additionally, the controller service queries the metadata service for configurations specific to the application services/resources/data services that the microservices communicate with—especially their security-related configurations, such as whether the data stored in the database accessed by a microservice is encrypted or not, or whether the connection to the data service is encrypted or not, or how open is the access to a specific data resource based on its network configuration and so on. This information is collected so that the system can assess the vulnerabilities/risks in the customer environment and determine which application-level interactions are likely to cause critical security breaches.

After collecting the telemetry, configuration data, and metadata for the past control loop period for all microservices running in the customer environment, the controller service creates a message with the latest combined data as the payload and sends it out to the SaaS control plane.

Referring again to FIG. 2, in an embodiment, the SaaS control plane operates as a central control plane that all customer-local controller services communicate with to send telemetry data and to fetch security policies and commands that are enforced locally in the customer environment. The central control plane comprises a message queue service, a controller service consisting of the middleware connecting frontend and API layers with backend data services, relational database services, stream processing services that perform event-based processing on data sourced from the message queue services, and graph processing services that run graph analytics algorithms on customer application telemetry data.

The controller service in the customer environment sends the telemetry data payload to the message queue service, which enables the processing of this data in an event-based, asynchronous manner. The asynchronous processing pattern can easily be scaled to hundreds and thousands of customer environments. A streaming service receives this payload from the queue, processes the data, and stores the data in a relational format in a database. Frontend APIs and UI services pull this data from middleware APIs in a graph format and present it to the end user as a security graph.

Embodiments can be programmed to provide telemetry-driven micro-segmentation enforcement capabilities using the distributed control plane architecture of FIG. 2. For example, in an embodiment, the Local Controller and microservice sidecars execute in the customer environment as a long-running daemon process. In a Kubernetes implementation, the Local Controller executes as an application deployment pod in the cluster. The Local Controller is programmed to discover microservices in the customer environment using the container platform (e.g., Kubernetes) APIs and cloud provider APIs and instantiates and launches a sidecar process alongside each microservice. The sidecar is installed into the microservice's API and data flow path, which enables it to be a point of visibility sourcing all the application layer API and data flow telemetry that is relayed to the local control plane and further to the global control plane, as well as a point of enforcement where application layer API and data security policies can be applied to enforce secure by design behavior for each microservice.

In an embodiment, the Sidecar elements of FIG. 2 can be programmed for policy enforcement. In an embodiment, the Local Controller configures the sidecars using each sidecar's control API, through which new security policies are expressed as YAML/JSON configurations, which are then applied within the sidecar. An example implementation in Kubernetes configures the Envoy sidecar through its control API, for example as described in the Envoy reference noted above, to apply security policies that enforce micro-segmentation rules for the specific microservice to which the sidecar is attached.

TABLE 3 shows an example configuration of a policy expressing a micro-segmentation configuration that a service with a "superuser" service account identity can access all the APIs of a destination service, but other service identities are only allowed to "GET" (HTTP method "GET") a product list, and only if the destination API is serving the product list at certain known ports.

TABLE 3

Envoy (Role-based access control) RBAC policy that applies
a micro-segmentation rule for a microservice identity accessing
another's service's API only if certain conditions
hold true (https://www.envoyproxy.io/docs/envoy/latest/api-
v3/config/rbac/v3/rbac.proto#config-rbac-v3-rbac)

```
action: ALLOW
policies:
    "service-admin":
        permissions:
            - any: true
        principals:
            - authenticated:
                principal_name:
                    exact: "cluster.local/ns/default/sa/admin"
            - authenticated:
                principal_name:
                    exact: "cluster.local/ns/default/sa/superuser"
    "product-viewer":
        permissions:
            - and_rules:
                rules:
                    - header:
                        name: ":method"
                        string_match:
                            exact: "GET"
                    - url_path:
                        path: { prefix: "/products" }
                    - or_rules:
                        rules:
                            - destination_port: 80
                            - destination_port: 443
        principals:
            - any: true
```

In an embodiment, the Local Controller is programmed to download one or more new micro-segmentation policies periodically using an API that the global control plane implements. TABLE 4 presents an example of a global control plane API that can be implemented in an embodiment.

TABLE 4

Global control plane API that the local
control plane uses to download commands

```
GET /operant/api/actions -H "Authorization: Bearer <token>"
Response example:
    {
    "control_type": "service_to_service_segmentation",
    "target_type": "service",
    "target_api": "",
    "parameters": "{\"target_namespace\": "staging", \"action\":
"deny"}",
    "target_service": "microservice-v1",
    "target_namespace": "dev",
    "target_cluster": "cluster-1.us-west-2.eksctl.io"
    }
```

In the example of Table 4 and in the drawing figures, references to "operant" merely provide one convenient label or name for a service that can implement the API, and other embodiments can use other labels or names to implement functionally equivalent programming and/or functional elements. After the Local Controller downloads one or more new micro-segmentation policies, the Local Controller converts the action JSON in the response, based on the control type, to the sidecar configuration seen in Table 3. During this transformation, the Local Controller uses the sidecar API payload format as expected in Table 3 and populates all the variable values from the action parameters specified in the JSON payload from Table 4. Examples of variable values include the principal name, the HTTP API method type (GET, POST, etc.), the API URL (such as/products, etc.), the destination service name, ports, and so on. The local controller may also interface with the container platform and cloud provider APIs to fetch identity and role information to add to the micro-segmentation policy corresponding to the source and destination service names in the action parameters JSON.

Embodiments are programmed to apply the micro-segmentation configuration locally within the sidecars using the sidecar's control API. Once applied, for each API or data request, the sidecar is programmed to evaluate the request's destination service identity/protocol/URL/query against the micro-segmentation rule configuration and to allow or deny the request.

In an embodiment, having the sidecar enforce micro-segmentation policies outside of the application container code helps apply the policies programmatically without needing any application code changes. Such a zero-instrumentation mechanism of applying security controls enables security teams to enforce security guardrails, such as micro-segmentation policies, at a layer separate from the application code. Consequently, embodiments enforce the separation of concerns and enable developers to control and update security policies independently at runtime. Embodiments also provide benefits in the pace at which security policies can be tested and updated at runtime without needing application development changes and the reliability with which security changes can be introduced or rolled back without disturbing application code.

FIG. 2 also reflects elements of a control plane, which can comprise multiple microservices. Embodiments can be programmed to rely on application traffic telemetry collected by the microservice sidecars to determine which service-to-service connections are present in a customer environment and which ones can be trusted. In an embodiment, a graph analytics processor reads application traffic telemetry data from the database, and sorts and de-duplicates telemetry records to form a representation of known service-to-service, or service-to-API, traffic segments that are trusted or non-malicious, as further described herein. Embodiments can be programmed to present the trusted traffic segments as recommendations for defining micro-segments on a computer display device using a graphical user interface, or in responses to programmatic calls to an API.

Further, in an embodiment, based on input specifying user approval, the global control plane can be programmed to convert the recommendations into micro-segmentation policies to be applied to relevant customer environments and applications. In an embodiment, the global controller stores policies using a customer environment identifier as a key value in the database. In an embodiment, the Local Controller for a customer environment periodically retrieves the policies using the API of Table 4 and enforces the policies within the microservice sidecar layer.

2.2 Example Data Processing Flows

Figure 3B:
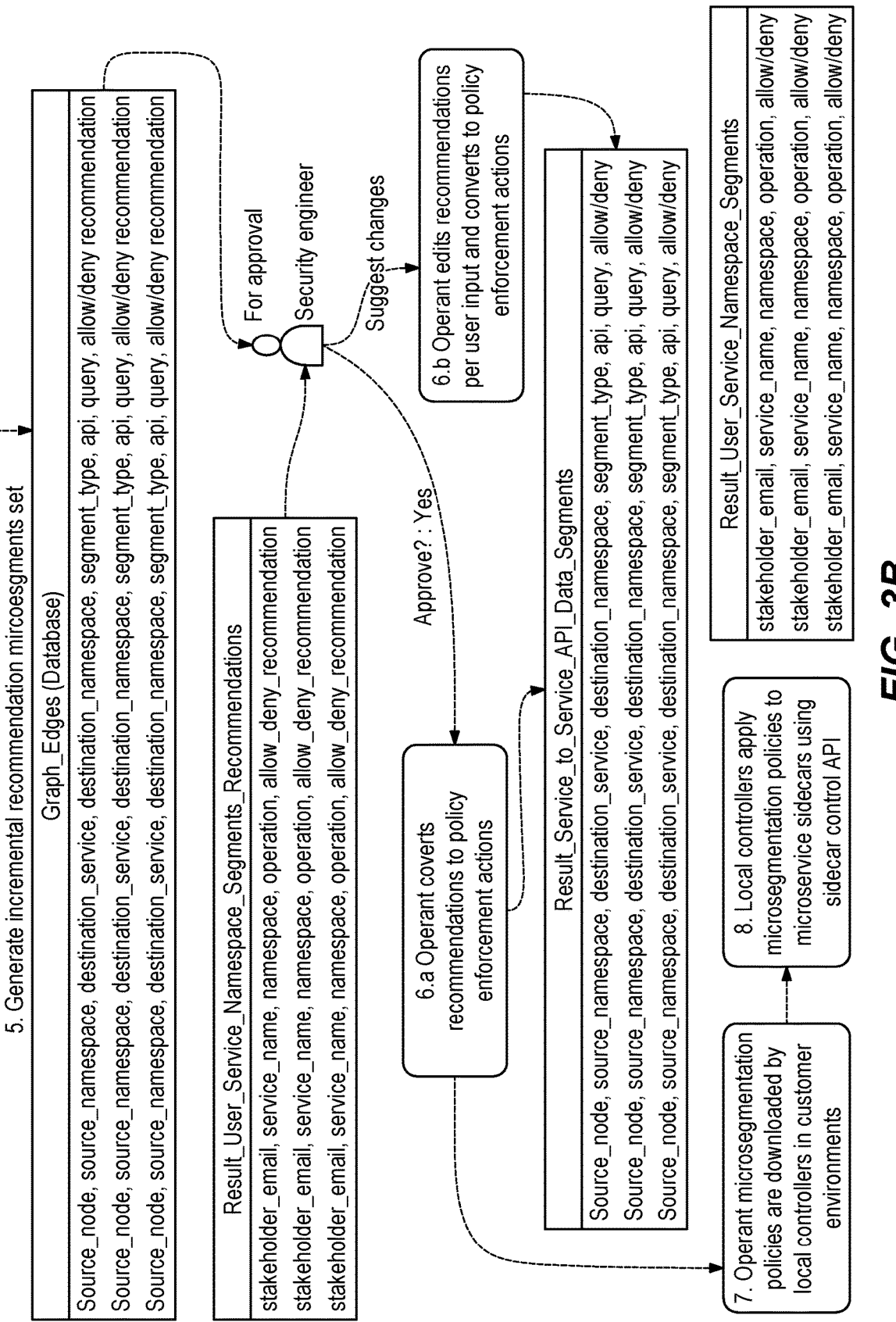

FIG. 3 illustrates example algorithms for recommending telemetry-driven application layer identity-based micro-segmentation policies and enforcing those policies within a customer environment using an embodiment. FIG. 3 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, the local control plane (FIG. 2) collects runtime application layer traffic telemetry from within customer environments and pushes it to the global control plane, where the global controller stores the telemetry in a database. To incorporate identity during telemetry collection, the local control plane may interface with the container platform APIs and the cloud provider APIs to fetch metadata information regarding the identities and roles of the microservices in the customer environment. In a Kubernetes implementation, the identity or role principal refers to the common name in the certificate identity provisioned to each microservice, such as "cluster.local/ns/default/sa/superuser" in the example shown in Table 3. Other implementations could include interfacing with a cloud provider API such as Amazon Web Services (AWS) to determine the IAM (Identity and Access Management) roles that allow access for microservices to AWS resources. As an example, a Kubernetes microservice container might be allowed access to write to an S3 object store bucket within the customer's AWS environment. The identity information is stored alongside each graph node in the global control plane database.

Referring now to FIG. 3, in an embodiment, step 1, step 2, step 3, and step 4 execute during a preparatory time phase once an embodiment is installed in a customer environment.

The description of this phase presumes that no known ongoing security incidents in the customer environments exist.

In Step 1, the graph analytics processor (FIG. 2) is programmed to get graph edges and APIs for each edge of a graph node. For example, the graph analytics processor service, as part of the global control plane deployment, reads the traffic telemetry data that is stored in the form of a graph data structure with nodes as microservices and edges as service-to-service interactions. For each node within the graph, the graph analytics processor collects the outgoing edges from the node with the node as the source node of the graph edge. Inputs can comprise records from a plurality of database tables, as seen in FIG. 3, including a Graph_Nodes table, Graph_Edges table, Apis_Security_Metrics table, Data_Security_Metrics table, and Service_owners table. Other embodiments can use different database schemas. After retrieving the edges, the graph analytics processor goes a step further and retrieves the APIs invoked along each graph edge if the destination service is a Layer 7 API serving microservice or data queries invoked if the destination service is a data service like Mysql. Graph nodes and edges can be stored in the main memory of a virtual compute instance that implements the graph analytics processor.

In Step 2, the graph analytics processor is programmed to compare the current list of graph edges per node against the previous set of graph edges for the node. The previous set of graph edges is the previous set of trusted edges between services constantly aggregated and updated based on telemetry from previous timestamped records by a separate batch data processor. The graph analytics processor retrieves a drift in the set of graph edges between the two telemetry snapshots. The drift set of graph edges outgoing from the graph node are by default recommended as "allowed".

At step 3, the graph analytics processor is programmed to compare the destination service host name and IP address with known malicious IP address lists to determine if any of those destination services are known to be nefarious. If there is a match, the edge is marked in memory as denied.

At step 4, the graph analytics processor is programmed to compare the edges against compliance policies encoded for the customer organization. The graph analytics processor can be programmed to retrieve the compliance policies from a database table, as seen in FIG. 3. For example, a payment processing service may not be allowed to share certain credit card information with certain payment vendors and might only be allowed to talk to internal payment checkout service providers. If an edge violates the compliance rule set, that edge is marked as denied by the service. Each of step 2, step 3, and step 4 can comprise creating, writing, and/or updating rows in an incremental recommendation micro-segments set in the database, such as Result_Service_to_Service_Api_Data_Segments_Recommendations table of FIG. 3 and/or the Result_User_Service_Namespace_Segments_Recommendations table of FIG. 3. Following these steps, the system can be programmed to present a list of the microsegment recommendations, as seen at step 5, to a user computer or account, typically a computer or account associated with a security team or security engineer, as seen at step 6.a.

The security team either approves the new list of microsegments or suggests changes to the list. Depending on input signals specifying user feedback, the system is programmed to either generate a new list of micro-segmentation policy actions or modify its recommendations based on user input, followed by generating the new list of micro-segmentation policies, as seen in step 6.b. These new policies are stored in the policy database ordered by customer environment identifiers. Policies can be stored in the Result_Service_to_Service_Api_Data_Segments table of FIG. 3 and/or the Result_User_Service_Namespace_Segments table of FIG. 3.

In a different implementation, security teams could allow the automatic enforcement of the system's micro-segmentation policy recommendations as a one-time configuration setting followed by a notification sent by the system to the security team describing such an automatic enforcement of micro-segmentation policies. Having an automatic enforcement policy in place for certain actions, such as blocking API access to nefarious IP addresses identified by the system, can help security teams quickly adapt to nefarious activity without the overhead of manual approvals.

At Step 7, in an embodiment, the local controllers are programmed to fetch the policy actions for their environment using the control plane APIs of the system. As stated in FIG. 3, in Step 7, micro-segmentation policies are downloaded by the local controllers in customer environments.

In Step 8, the local controllers are programmed to decode the policy actions, encode the relevant microsegments as sidecar configurations, and enforce them by configuring the sidecar through its control API. Once configured, the sidecar enforces the micro-segmentation policy behavior for the microservice. As an example from FIG. 1, any communication from the "cartservice" microservice to external APIs other than to the Redis cache could be denied, while the payment processing microservice could be allowed to make only certain external 3rd party API calls.

As new application layer traffic telemetry data is added, the graph analytics processor is programmed to continue computing drift in previously established microsegment edges and current traffic patterns and may recommend new micro-segments allowing or denying new traffic for each service, thus adapting micro-segmentation policies to evolving application traffic patterns.

2.3 Benefits and Improvements

While micro-segmentation has been an effective technique to defend against lateral movement attacks, which remain the primary method for causing a data breach, cloud-native application stacks introduce significant hurdles in successfully deploying micro-segmentation due to their scale, complexity, and pace of change. Embodiments offer key technological innovations to security teams to help them overcome these deployment hurdles by making it easy to assess microservice communication patterns at runtime with runtime telemetry, recommending microsegments driven by runtime telemetry, and enforcing those recommended policies in an automated manner within customer application stacks. Finally, the technology of this disclosure enables teams to apply micro-segmentation policies to the application's identity and API layers, thus reducing the risk of breach within these newer attack surfaces that are only continuing to expand in today's cloud-native stacks.

3. IMPLEMENTATION EXAMPLE-HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
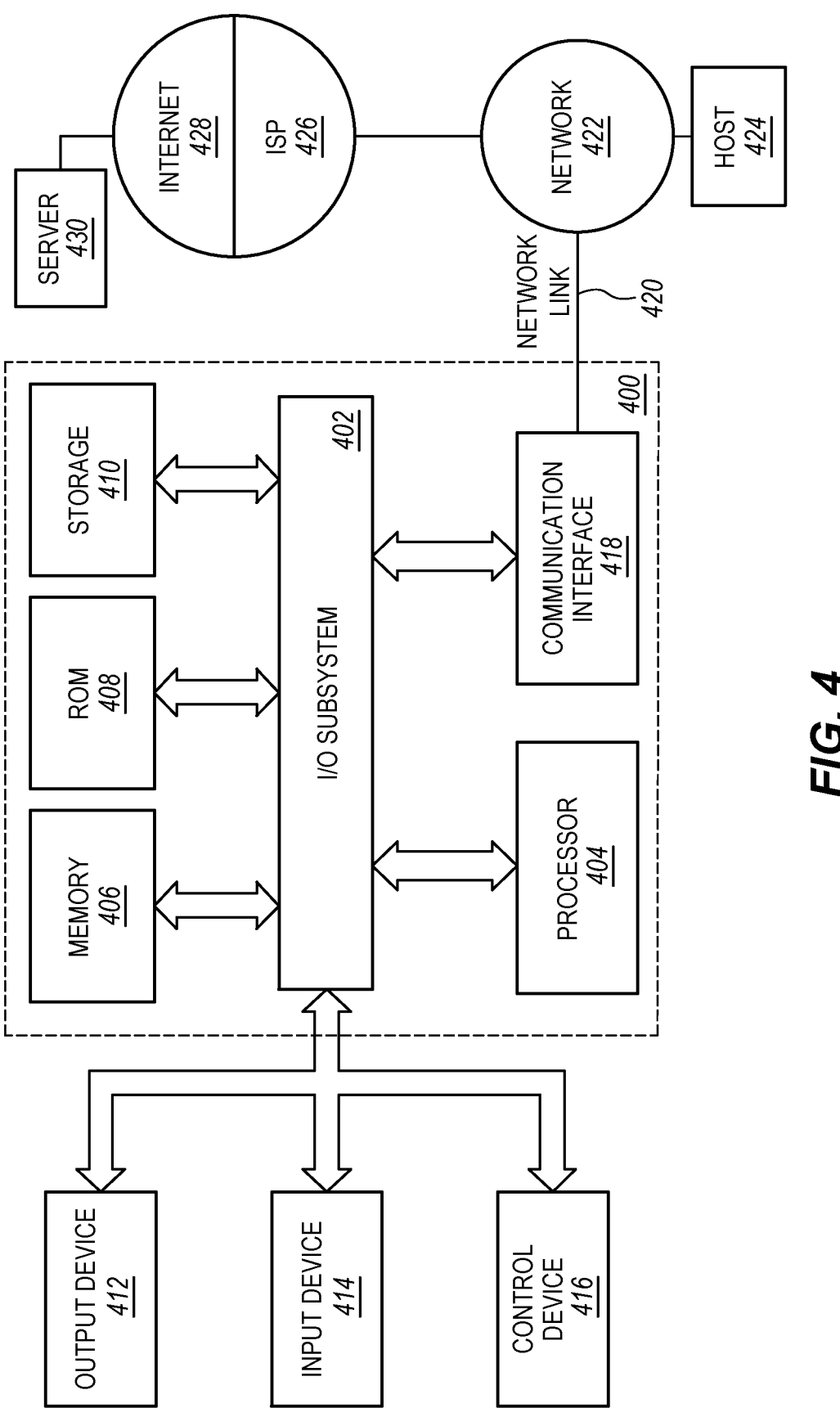
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 400 includes an input/output (I/O) subsystem 402, which may include a bus and/or another communication mechanism(s) for communicating information and/or instructions between the components of the computer system 400 over electronic signal paths. The I/O subsystem 402 may include an I/O controller, a memory controller, and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU), or a digital signal processor or ARM processor. Processor 404 may comprise an integrated arithmetic logic unit (ALU) or may be coupled to a separate ALU.

Computer system 400 includes one or more units of memory 406, such as the main memory, which is coupled to I/O subsystem 402 for electronically digitally storing data and instructions to be executed by processor 404. Memory 406 may include volatile memory such as various forms of random-access memory (RAM) or other dynamic storage device. Memory 406 may also be used for storing temporary variables or other intermediate information during the execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read-only memory (ROM) 408 or other static storage devices coupled to I/O subsystem 402 for storing information and instructions for processor 404. The ROM 408 may include various forms of programmable ROM (PROM), such as erasable PROM (EPROM) or electrically erasable PROM (EEPROM). A unit of persistent storage 410 may include various forms of non-volatile RAM (NVRAM), such as FLASH memory, solid-state storage, magnetic disk, or optical disks such as CD-ROM or DVD-ROM and may be coupled to I/O subsystem 402 for storing information and instructions. Storage 410 is an example of a non-transitory computer-readable medium that may be used to store instructions and data, which, when executed by processor 404, causes performing computer-implemented methods to execute the techniques herein.

The instructions in memory 406, ROM 408, or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer, such as a relational database system using a structured query language (SQL) or no SQL, an object store, a graph database, a flat file system, or other data storage.

Computer system 400 may be coupled via I/O subsystem 402 to at least one output device 412. In one embodiment, output device 412 is a digital computer display. Examples of a display that may be used in various embodiments include a touchscreen display, a light-emitting diode (LED) display, a liquid crystal display (LCD), or an e-paper display. Computer system 400 may include another type(s) of output device 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections, or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 414 may include a combination of multiple different input devices, such as a video camera and a depth sensor.

In another embodiment, computer system 400 may comprise an Internet of Things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders, and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 402. Transmission media can also take the form of acoustic or light waves, such as those generated during radio-wave and infrared data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal, and appropriate circuitry can provide the data to I/O subsystem 402, such as placing the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a worldwide packet data communication network represented as Internet 428. A server computer 430 may be coupled to Internet 428. Server 430 broadly represents any computer, data center, virtual machine, or virtual computing instance with or without a hypervisor or computer executing a containerized program system such as DOCKER or KUBERNETES. Server 430 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer, and data storage layer, such as a relational database system using a structured query language (SQL) or no SQL, an object store, a graph database, a flat file system, or other data storage.

Computer system 400 can send messages and receive data and instructions, including program code, through the network(s), network link 420, and communication interface 418. In the Internet example, a server 430 might transmit a requested code for an application program through Internet 428, ISP 426, local network 422, and communication interface 418. The received code may be executed by processor 404 as it is received and/or stored in storage 410 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing security of an application, the computer-implemented method executed using one or more processors of a server computer and comprising:

using a local control plane deployed within a computing environment:

interfacing with application programming interfaces (APIs) of microservices executing in the computing environment and obtaining telemetry data;

aggregating the telemetry data into a telemetry data payload; and sending a message containing the telemetry data payload to a message queue service of a central control plane;

using the central control plane:

for a graph node representing a microservice, based on the telemetry data payload, obtaining a set of graph edges, the set of graph edges including information representing interaction between the microservices;

comparing the set of graph edges with a previous set of graph edges, the previous set of graph edges determined based on previous telemetry data; and for each graph edge of the set of graph edges:

comparing at least one of a host name or an internet protocol (IP) of an edge associated destination service with a corresponding one of a malicious host name or a malicious IP to determine whether the destination service is malicious;

when the destination service is determined to be malicious, marking the graph edge as denied;

comparing a graph edge associated interaction with compliance policies to determine whether the interaction is allowed, and when the interaction violates the compliance policies, marking the graph edge as denied; and generating a set of incremental recommendation microsegments;

using the local control plane:

fetching the set of incremental recommendation microsegments; and enforcing the set of incremental recommendation microsegments for the microservices executing in the computing environment.

2. The computer-implemented method of claim 1, further comprising obtaining application programming interface (API) data for each graph edge from the set of graph edges, and wherein the API data includes API security metrics.

3. The computer-implemented method of claim 2, wherein the API security metrics comprise one or more of an edge identifier (ID) or an API method for each graph edge.

4. The computer-implemented method of claim 1, wherein the telemetry data includes graph edge data comprising a source node representing a source service; a source namespace; a destination node representing a destination service; a destination namespace; and time at which an interaction between the source node and the destination node occurred.

5. The computer-implemented method of claim 1, wherein the telemetry data includes graph node data comprising a node identifier (ID); an identity; a namespace; a security configuration; and a timestamp.

6. The computer-implemented method of claim 1, wherein the telemetry data includes data security metric comprising one or more of an edge identifier (ID); a query method; or a data resource.

7. The computer-implemented method of claim 1, wherein the telemetry data includes information about service owners, the information comprising an email of an owner; a service name; and a role of the owner.

8. The computer-implemented method of claim 1, wherein the comparing the set of graph edges with the previous set of graph edges includes identifying a drift in the set of graph edges, and wherein graph edges from the set of graph edges identified as belonging to the drift are configured by default to be recommended as allowed.

9. The computer-implemented method of claim 1, wherein the compliance policies include information about a service name; a namespace; and a rule set.

10. The computer-implemented method of claim 1, the set of incremental recommendation microsegments including at least information about a source node; a destination service; and whether interaction between the source node and the destination service is allowed or denied.

11. The computer-implemented method of claim 10, wherein the local control plane comprises a plurality of sidecar processes, each sidecar process among the plurality of sidecar processes being generated for and corresponding to each microservice among the microservices; wherein each sidecar process among the plurality of sidecar processes is configured to have access to data flowing in and out of a corresponding microservice of the microservices and to enforce a micro-segmentation policy for the microservice.

12. The computer-implemented method of claim 11, wherein the data flowing in and out of the corresponding microservice includes at least one of request source hostname, request destination hostname, request destination port, request source service name, or request destination service name.

13. The computer-implemented method of claim 11, wherein the data flowing in and out of the corresponding microservice includes at least one request API endpoint, request API method, request protocol, request authentication headers, response code, response error message, response error status, or number of requests.

14. The computer-implemented method of claim 11, wherein the enforcing an incremental recommendation microsegment for a microservice includes configuring a sidecar corresponding to the microservice via a control API corresponding to the sidecar, to enforce a micro-segmentation policy associated with the incremental recommendation microsegment.

15. The computer-implemented method of claim 11, wherein the micro-segmentation policy for each microservice enforces zero trust for all communications for that microservice.

16. The computer-implemented method of claim 10, the method further comprising:

receiving an input specifying feedback related to the set of incremental recommendation microsegments;

based on the input, modifying the set of incremental recommendation microsegments; and based on the modified incremental recommendation microsegments, generating a new list of micro-segmentation policies.

17. The computer-implemented method of claim 16, wherein the micro-segmentation policies are configured to be stored in a policy database ordered by customer environment identifiers.

18. The computer-implemented method of claim 10, wherein the source node and the destination service comprise runtime identity information, wherein the runtime identity information includes at least one of: certificate identifiers of service accounts, API keys, or service account role.

19. The computer-implemented method of claim 1, wherein the telemetry data payload is processed in an event-based asynchronous manner.

20. The computer-implemented method of claim 1, wherein the telemetry data is collected at runtime in real-time.

21. The computer-implemented method of claim 1, wherein the local control plane is further configured to query a metadata service of a container platform API to obtain security-related data including whether data stored in a database accessed by a microservice is encrypted; whether a connection to a data service is encrypted; and how open is an access to a specific data resource based on its network configuration.

22. One or more non-transitory computer-readable storage media storing one or more sequences of instructions which, when executed using one or more processors, cause the one or more processors to execute a method comprising:

using a local control plane deployed within a computing environment:

interfacing with application programming interfaces (APIs) of microservices executing in the computing environment, and obtaining telemetry data;

aggregating the telemetry data into a telemetry data payload; and sending a message containing the telemetry data payload to a message queue service of a central control plane;

using the central control plane:

for a graph node representing a microservice, based on the telemetry data payload, obtaining a set of graph edges, the set of graph edges including information representing interaction between the microservices;

comparing the set of graph edges with a previous set of graph edges, the previous set of graph edges determined based on previous telemetry data; and for each graph edge of the set of graph edges:

comparing at least one of a host name or an internet protocol (IP) of an edge associated destination service with a corresponding one of a malicious host name or a malicious IP to determine whether the destination service is malicious;

when the destination service is determined to be malicious, marking each graph edge as denied;

comparing each graph edge associated interaction with compliance policies to determine whether the interaction is allowed, and when the interaction violates the compliance policies, marking each graph edge as denied; and generating a set of incremental recommendation microsegments;

using the local control plane:

fetching the set of incremental recommendation microsegments; and enforcing the set of incremental recommendation microsegments for the microservices executing in the computing environment.

23. The one or more non-transitory computer-readable storage media of claim 22, further comprising obtaining application programming interface (API) data for each graph edge from the set of graph edges, and wherein the API data includes API security metrics.

24. The one or more non-transitory computer-readable storage media of claim 23, wherein the API security metrics comprise one or more of an edge identifier (ID) or an API method for each graph edge.

25. The one or more non-transitory computer-readable storage media of claim 22, wherein the telemetry data includes graph edge data comprising a source node representing a source service; a source namespace; a destination node representing a destination service; a destination namespace; and time at which an interaction between the source node and the destination node occurred.

26. The one or more non-transitory computer-readable storage media of claim 22, wherein the telemetry data includes graph node data comprising a node identifier (ID); an identity; a namespace; a security configuration; and a timestamp.

27. The one or more non-transitory computer-readable storage media of claim 22, wherein the telemetry data includes data security metric comprising one or more of an edge identifier (ID); a query method; or a data resource.

28. The one or more non-transitory computer-readable storage media of claim 22, wherein the telemetry data includes information about service owners, the information comprising an email of an owner; a service name; and a role of the owner.

29. The one or more non-transitory computer-readable storage media of claim 22, wherein the comparing the set of graph edges with the previous set of graph edges includes identifying a drift in the set of graph edges, and wherein graph edges from the set of graph edges identified as belonging to the drift are configured by default to be recommended as allowed.

30. The one or more non-transitory computer-readable storage media of claim 22, wherein the compliance policies include information about a service name; a namespace; and a rule set.

31. The one or more non-transitory computer-readable storage media of claim 22, the set of incremental recommendation microsegments including at least information about a source node; a destination service; and whether interaction between the source node and the destination service is allowed or denied.

32. The one or more non-transitory computer-readable storage media of claim 31, wherein the local control plane comprises a plurality of sidecar processes, each sidecar process among the plurality of sidecar processes being generated for and corresponding to each microservice among the microservices; wherein each sidecar process among the plurality of sidecar processes is configured to have access to data flowing in and out of a corresponding microservice of the microservices and to enforce a micro-segmentation policy for the microservice.

33. The one or more non-transitory computer-readable storage media of claim 32, wherein the data flowing in and out of the corresponding microservice includes at least one of request source hostname, request destination hostname, request destination port, request source service name, or request destination service name.

34. The one or more non-transitory computer-readable storage media of claim 32, wherein the data flowing in and out of the corresponding microservice includes at least one request API endpoint, request API method, request protocol, request authentication headers, response code, response error message, response error status, or number of requests.

35. The one or more non-transitory computer-readable storage media of claim 32, wherein the enforcing an incremental recommendation microsegment for a microservice includes configuring a sidecar corresponding to the micro-service via a control API corresponding to the sidecar, to enforce a micro-segmentation policy associated with the incremental recommendation microsegment.

36. The one or more non-transitory computer-readable storage media of claim 32, wherein the micro-segmentation policy for each microservice enforces zero trust for all communications for that microservice.

37. The one or more non-transitory computer-readable storage media of claim 31, the method further comprising:

receiving an input specifying feedback related to the set of incremental recommendation microsegments;

based on the input, modifying the set of incremental recommendation microsegments; and based on the modified incremental recommendation microsegments, generating a new list of micro-segmentation policies.

38. The one or more non-transitory computer-readable storage media of claim 37, wherein the micro-segmentation policies are configured to be stored in a policy database ordered by customer environment identifiers.

39. The one or more non-transitory computer-readable storage media of claim 31, wherein the source node and the destination service comprise runtime identity information, wherein the runtime identity information includes at least one of: certificate identifiers of service accounts, API keys, or service account role.

40. The one or more non-transitory computer-readable storage media of claim 22, wherein the telemetry data payload is processed in an event-based asynchronous manner.

41. The one or more non-transitory computer-readable storage media of claim 22, wherein the telemetry data is collected at runtime in real-time.

42. The one or more non-transitory computer-readable storage media of claim 22, wherein the local control plane is further configured to query a metadata service of a container platform API to obtain security-related data including whether data stored in a database accessed by a microservice is encrypted; whether a connection to a data service is encrypted; and how open is an access to a specific data resource based on its network configuration.

* * * * *